United States Patent [19]

Thomson

[11] 3,895,835
[45] July 22, 1975

[54] ENERGY ABSORBING DEVICES

[75] Inventor: Ian M. Thomson, Wokingham, England

[73] Assignee: Enersorb Limited, Camberley, England

[22] Filed: July 23, 1973

[21] Appl. No.: 381,553

[30] Foreign Application Priority Data
Aug. 11, 1972 United Kingdom............ 37678/72
Nov. 2, 1972 United Kingdom............ 50651/72

[52] U.S. Cl............... 293/71 R; 114/219; 267/140; 293/1; 293/96
[51] Int. Cl......................................... B60r 19/08
[58] Field of Search.......... 293/1, 24, 64, 70, 71 R, 293/72, 87, 88, 96, 71 P; 267/140; 152/358, 359; 114/219

[56] References Cited
UNITED STATES PATENTS

| | | | |
|---|---|---|---|
| 1,709,493 | 4/1929 | Shoemaker | 239/71 P |
| 1,985,113 | 12/1934 | Smith | 293/71 R |
| 2,257,646 | 9/1941 | Pierce | 152/358 |
| 3,107,642 | 10/1963 | Lakin | 267/140 X |
| 3,610,609 | 10/1971 | Sobel | 293/1 X |
| 3,638,985 | 2/1972 | Barton et al. | 293/71 |
| 3,744,835 | 7/1973 | Carbone et al. | 293/1 |

FOREIGN PATENTS OR APPLICATIONS

| | | | |
|---|---|---|---|
| 580,838 | 9/1946 | United Kingdom | 152/359 |
| 899,237 | 6/1962 | United Kingdom | 74/231 R |
| 994,474 | 6/1965 | United Kingdom | 74/231 R |
| 1,274,223 | 5/1972 | United Kingdom | 152/359 |
| 1,278,244 | 6/1972 | United Kingdom | 152/359 |

*Primary Examiner*—Lloyd L. King
*Assistant Examiner*—Andres Kashnikow
*Attorney, Agent, or Firm*—Wolfe, Hubbard, Leydig, Voit & Osann, Ltd.

[57] ABSTRACT

An energy absorbing device is disclosed, comprising a composite beam structure including an elastomeric material with a plurality of substantially straight embedded filaments of flexible material. The composite structure is mounted such that the energy of an impact is at least partially absorbed by the bending resistance of the composite beam structure. There are normally at least two sets of parallel filaments in spaced, parallel planes. Also disclosed is a vehicle fender formed by a generally U-shaped channel section with the outside of the base of the U forming an impact receiving face. The wall of the channel may be made of the composite beam structure material referred to above, and the distal ends of the legs of the U are clamped to the vehicle such that an impact on the impact receiving face tends to deform the material and its energy is absorbed by the resistance to bending of the legs of the U.

42 Claims, 18 Drawing Figures

PATENTED JUL 22 1975 3,895,835

SHEET 1

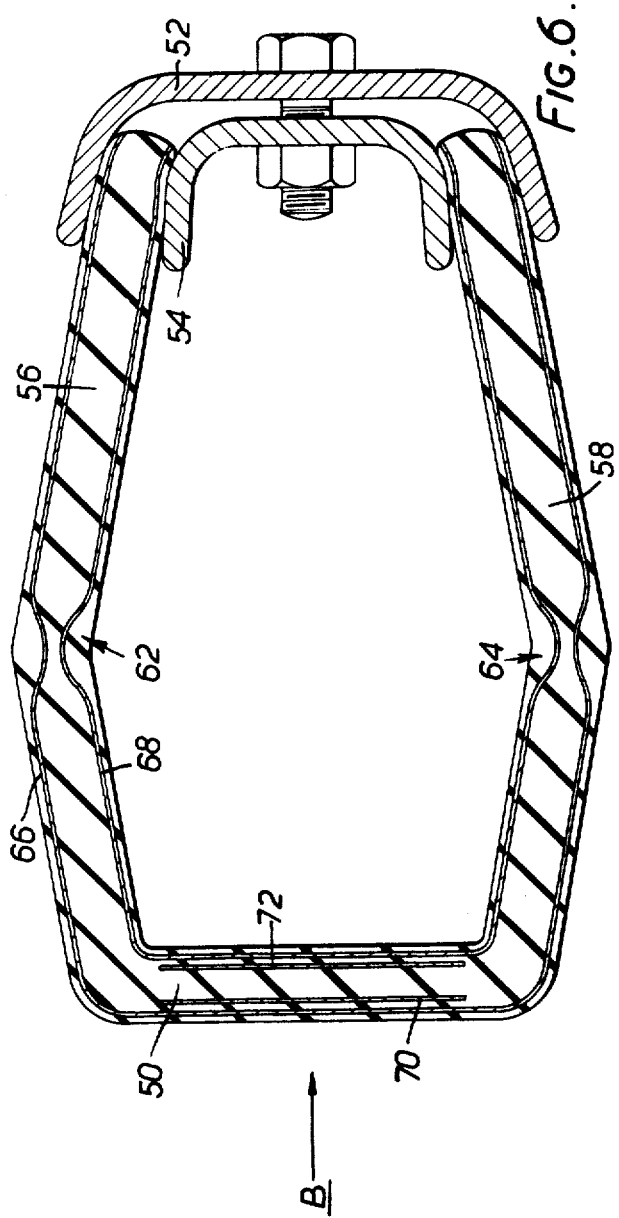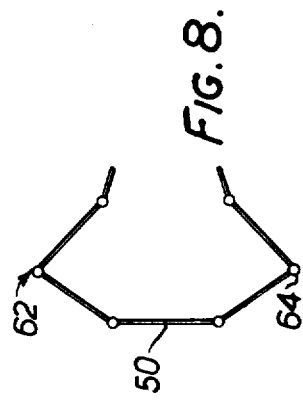

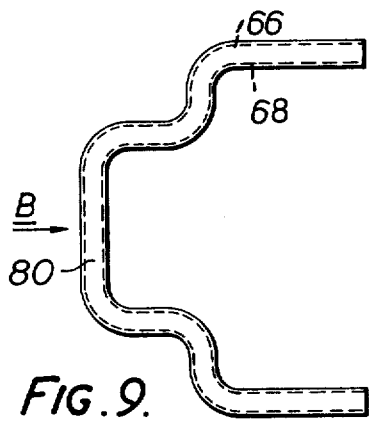
FIG.9.
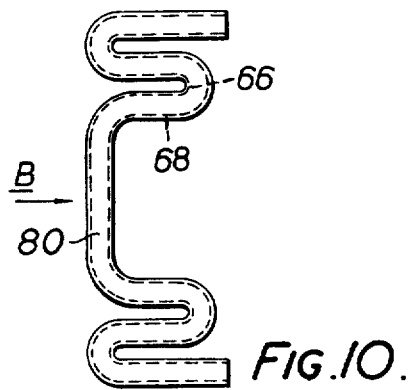
FIG.10.
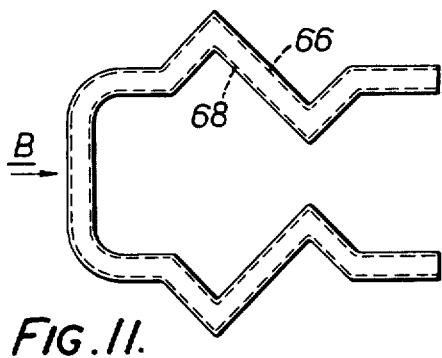
FIG.11.
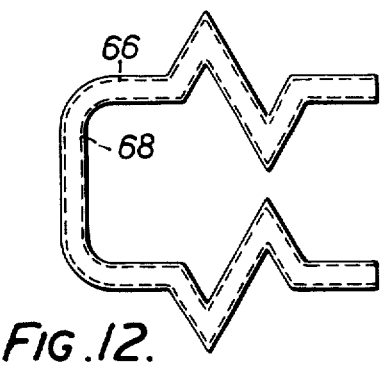
FIG.12.
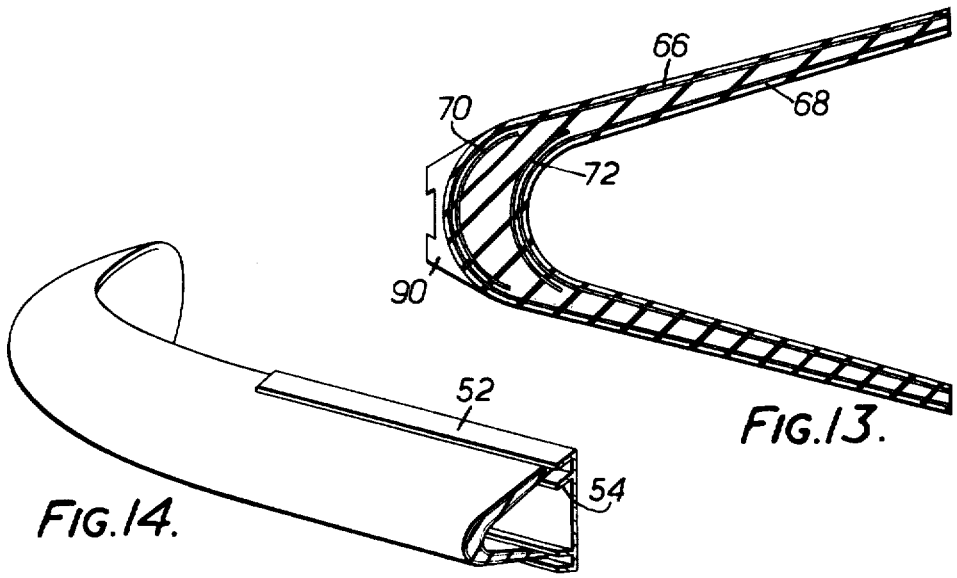
FIG.13.
FIG.14.

3,895,835

ENERGY ABSORBING DEVICES

The invention relates to articles incorporating flexible elastomeric material, and also to energy absorbing devices.

According to the invention, there is provided an energy absorbing device, comprising a composite beam structure including an elastomeric material with a plurality of substantially straight embedded filaments of flexible material, the composite structure being arranged for mounting such that the energy of an impact is at least partially absorbed by the bending resistance of the composite beam structure.

According to the invention, there is also provided an energy absorbing device, comprising wall means embracing or surrounding a space and outwardly presenting an impact receiving face and at least partly made of a composite beam structure including an elastomeric material with a plurality of embedded filaments of flexible material which extend longitudinally towards the said face, such that an impact on the said face tends to deform the wall means and its energy is at least partially absorbed by the resistance to bending of the composite beam structure.

According to the invention, there is further provided an energy absorbing device, comprising wall means embracing or surrounding a space and outwardly presenting a face for receiving an impact whose energy is to be absorbed, the wall means being constructed of material having substantial resistance to bending so as to resist deformation by an impact and thereby absorb the energy of the impact.

According to the invention, there is also provided an energy absorbing device, comprising wall means defining a face for receiving an impact whose energy is to be absorbed and arranged to deform in response to the said impact, the wall means being made of resilient material having substantial resistance to bending whereby the bending resistance absorbs at least part of the energy of the impact, the said face being non co-planar over its length.

Energy absorbing devices embodying the invention will now be described, by way of example only, with reference to the accompanying drawings in which:

FIG. 6 is a cross-section corresponding to FIG. 4 and through another of the devices;

FIGS. 7 and 8 are diagrams explaining the operation of the devices of FIGS. 4, 5 and 6 and respectively show the devices in the normal and deformed states;

FIGS. 9 and 10 are diagrammatic cross-sectional views showing another of the energy absorbing devices, respectively in its normal and deformed positions;

Figure 15:
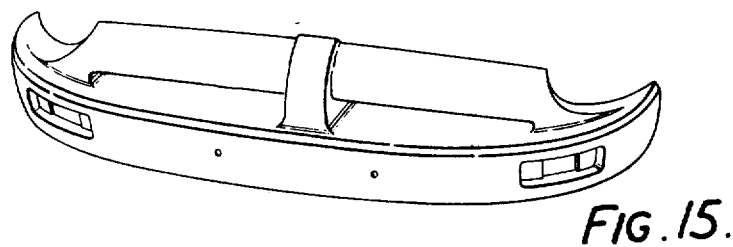
Figure 16:
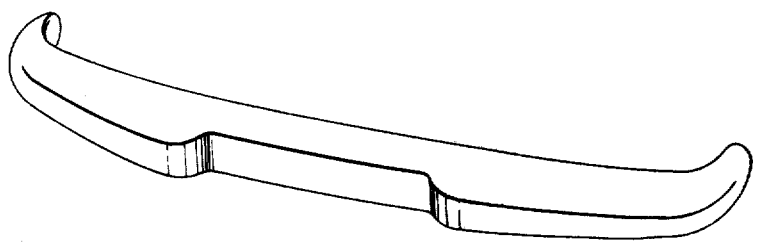
Figure 17:
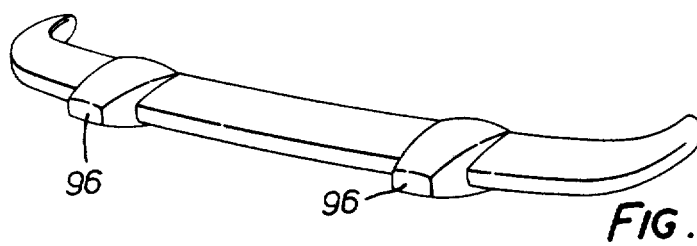
Figure 18:
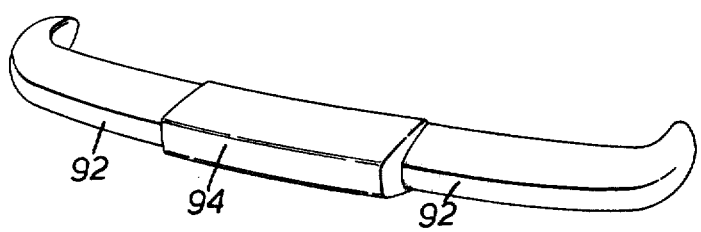

FIGS. 11 and 12 correspond respectively to FIGS. 9 and 10 but show a further one of the energy absorbing devices;

FIG. 13 is a cross-sectional view through a further one of the energy absorbing devices;

FIG. 14 is a perspective view of a cutaway end of the device of FIG. 13;

FIG. 15 is a perspective view showing another one of the energy absorbing devices in position as a bumper or fender on a vehicle; and FIGS. 16, 17 and 18 are respectively diagrammatic perspective views of further ones of the energy absorbing devices.

As will be described below, there is provided an article which is made of flexible elastomeric or rubber material in which are embedded a plurality of flexible filaments. These filaments may be made of metal or plastics material of suitable modulus of elasticity and diameter and are found to increase the stiffness or resistance to bending of the article with respect to forces acting about axes transverse to the directions of extension of the filaments. This increase in stiffness is caused by the filaments and the elastomeric material acting together as a composite beam, that is, a beam where the tensile and compressive forces are mainly taken by the filaments and the shear forces mainly taken by the elastomeric material.

Figure 1:
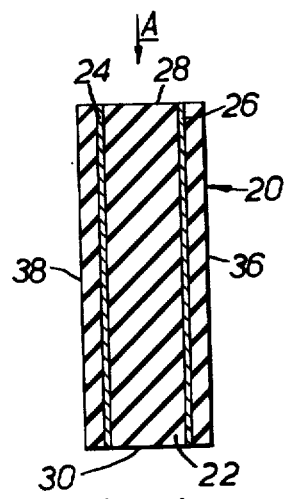
FIG. 1 is a section, on the line I—I of FIG. 2, through a piece of material for use in the devices.
Figure 2:
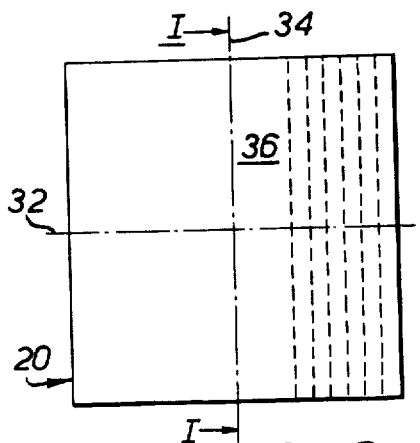
FIG. 2 is an elevation of the piece of material of FIG. 1.

For ease of manufacture, the filaments preferably comprise pieces of a woven fabric, and FIG. 1 shows a cross-section through an element 20 made of rubber 22 in which two layers 24 and 26 each made of such a fabric are embedded. In each fabric layer 24, 26, the filaments are arranged in parallel relation to each other and extend from the top 28 to the bottom 30 of the article; FIG. 2 shows some of the filaments in dotted outline, purely diagrammatically for purposes of explanation. It is found that the filaments give the element a greatly increased resistance to bending forces acting about axes (axis 32, FIG. 2, for example) transverse to the direction of extension of the filaments. The resistance to bending forces acting about axes (axis 34, FIG. 2, for example) parallel to the filaments is affected to a much lesser extent by the provision of the filaments. The increase in stiffness provided by the filaments depends on the position of the filaments within the elastomeric material. Thus, the increase in stiffness is greater as the fabric layers 24 and 26 are moved apart and come respectively closer to the surfaces 36 and 38 of the article.

In addition the stiffness may be altered by having a different number of filaments per lineal inch.

Although two sets of filaments (that is, two fabric layers 24 and 26) have been shown in FIGS. 1 and 2, it will be appreciated that more or less numbers of filament sets may be provided, though at least two sets of filaments are advantageously provided.

Moreover, where two or more rows of filaments are provided in the elastomeric material, the filaments of one row may extend in a different direction from those in another row. In such a case, the element stiffness will be increased in more than one direction. Thus, for example, if the filaments in the fabric layer 26 of FIGS. 1 and 2 extend perpendicularly to those in the fabric layer 24, then the resistance of the element to bending about axis 34 will be increased as well as its resistance about axis 32.

On the assumption that the filaments in at least one of the fabric layers 24 and 26 extend from the top 28 to the bottom 30 of the element 20 (so as to increase the resistance to bending about axis 32), the element of FIGS. 1 and 2 may be used as an energy absorbing or impact cushioning device if it is mounted so as to receive the impact in the direction of the arrow A. Such an impact will tend to bend the element about the axis 32 (and parallel axes) and this will be resisted by the composite beam, and the energy of the impact will thus be absorbed by the resistance to bending imparted to the element by the composite beam effect of the filaments and the elastomeric material.

Figure 3:
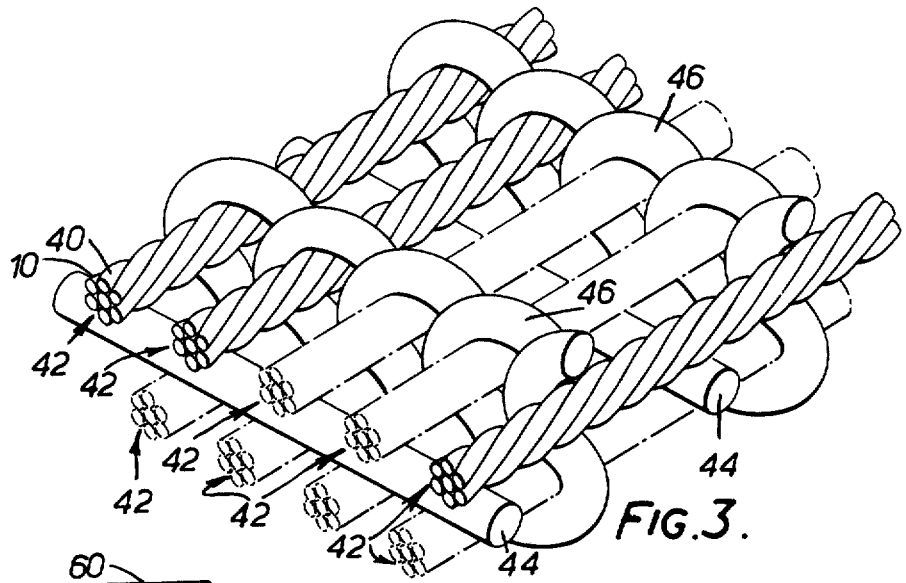
FIG. 3 is a diagrammatic perspective view, to a greatly enlarged scale, of a piece of woven fabric containing flexible plastics filaments for incorporation in the material of FIGS. 1 and 2.

FIG. 3 shows part of one of the fabric layers 24 and 26 to a greatly enlarged scale. As shown, the filaments, referenced 40, are arranged in bundles each containing seven filaments which are spun into respective yarns 42. The fabric contains two rows of yarns 42 and is woven so that the yarns of each row are separated by spacing strands 44 and held together by transverse lacing strands 46 which pass through the filament rows and around the yarns.

As explained above, the stiffness imparted to the article in which the fabric is embedded depends on the modulus of elasticity of the filaments and the number of filaments. In order to maximize the stiffness, the yarns 42 are spun with as little twist of the filaments as possible, since twisting reduces the modulus of elasticity of the yarn. By minimizing the amount of twist, the modulus of elasticity of each yarn is kept as close as possible to that of each filament. For the same reason, the yarns 42 are kept as straight as possible without inter-weaving and with little or no crimping so that the modulus of elasticity of the fabric in the direction of the yarns is as close as possible to that of the yarn and the filaments.

The size and the modulus of elasticity of the filaments should be sufficiently high to give useful results. It is found that normally the modulus of elasticity should exceed 10,000 lbs. per sq. inch (700 kilograms per sq. cm) and preferably be above 100,000 lbs. per sq. inch (7000 kilograms per sq. cm); a value in the range 400,000 to 600,000 lbs. per sq. inch (28,000 kilograms per sq. cm to 42,000 kilograms per sq. cm.) is particularly suitable. The preferred size of the filaments depends on their modulus of elasticity; a lower modulus of elasticity requires a larger filament diameter to give the same results as a higher modulus of elasticity with a smaller filament diameter. Normally, the filament diameter should exceed 0.001 inches (0.025 millimetres). Preferably, the modulus of elasticity and the filament diameter are not sufficiently great to prevent or hinder weaving of the filaments into the fabric, using a standard weaving machine.

In one particular example of the fabric, each filament is made of polyethylene terephthalate ("Terylene," Trade Mark) and is of substantially circular cross-section with a diameter of 0.010 inches (0.25 millimeters) and a modulus of elasticity of about 600,000 lbs. per sq. inch (42,000 kilograms per sq. cm). Their breaking stress is between 50,000 and 100,000 lbs. per sq. inch (3500 to 7000 kilograms per sq. cm) and their extension at break is between 5% and 20%.

In this example, each row in the fabric (FIG. 3) has 22 yarns per inch (8.70 per centimeter) so that there are a total of 44 yarns per inch (17.40 per centimeter).

It has been found advantageous to stretch each yarn during manufacture and then to allow it partially to resile, before weaving it into the fabric. This is found to decrease the permanent set given to the yarn by any stretching which might take place subsequently, in use for example. In addition, it is found to increase the modulus of elasticity of the yarn.

Although the yarns 42 have been illustrated in FIG. 3 as all extending in the same direction, they may be woven so as to extend in different directions, thus providing increased resistance to bending in various directions as explained above in connection with FIGS. 1 and 2.

Although the filaments have been illustrated as being of circular cross-section, they may instead be non-circular in cross-section, and for the purposes of this Specification, a filament of non-circular cross-section is considered to have a diameter equivalent to that of a filament of circular cross-section having a moment of inertia equal to the minimum moment of inertia of the filament of non-circular cross-section.

Instead of polyethylene terephthalate, the filaments may be made of other material such as nylon or other plastics material, but to obtain similar results larger filament diameters may be necessary than with polyethylene terephthalate. The filaments used should be resistant to fatigue, able to bond to the elstomer, and resistant to chemical, moisture and radiation attack and should have good ageing properties.

The fabric may be incorporated into the elastomeric material by any suitable method which ensures adequate bonding between the material and the fabric.

The weave of the fabric may be sufficiently open so that rubber can readily penetrate the fabric during manufacture to provide a good bond.

Figure 4:
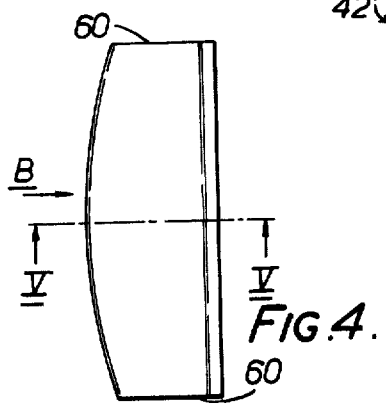
FIG. 4 is a plan view of one of the energy absorbing devices.
Figure 5:
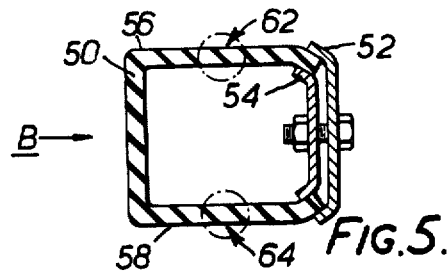
FIG. 5 is a cross-section through the device of FIG. 4, on the line V—V of FIG. 4.

FIGS. 4 and 5 show an energy absorbing device in the form of a bumper or fender such as for fitment to a vehicle. The device is hollow and of generally U-shape in section. The base 50 of the U-shape is positioned to receive the impact in the direction of the arrow B, and the device is supported on the vehicle by strong clamps 52 and 54 which hold the distal ends of the legs 56 and 58 of the U. The legs 56 and 58 are generally straight and parallel, and the whole device, especially the legs 56 and 58, is made of material with good resistance to bending about axes which lie in the planes of the legs and extend between the ends 60, 60 of the device.

FIG. 8 shows how the device responds to an impact in the direction of the arrow B. By suitably constructing the legs 56, 58, as by incorporaing points of relatively lower bending resistance in regions 62, 64, the legs 56, 58 are caused to bend outwards in response to the impact, and the resistance to bending of the legs 56 and 58 cushions the impact and absorbs its energy. Instead of incorporating points of lower bending resistance in the legs, it is found that the same effect may be achieved by adjusting the stiffness of the base 50 of the U relative to that of the legs 56 and 58.

The device of FIGS. 4 and 5 may be constructed of any suitable material, but advantageously the material is of the type disclosed above in connection with FIGS. 1 and 2 in which flexible filaments are embedded in elastomeric material such as rubber. FIG. 6 shows a cross-section, corresponding generally to FIG. 5 and in plan appearing generally as in FIG. 4, through such a device in which the device is constructed of rubber with two fabric layers 66 and 68 (corresponding to fabric layers 24 and 26 of FIG. 1) embedded in it. The filaments in each of the layers 66 and 68 extend parallel to each other around the U from the distal end of one leg 56 to the distal end of the other leg 58, and the layers 66, 68 extend between the two ends 60 of the device. Additionally, two further fabric layers 70, 72, similar to the layers 24, 26 of FIG. 1, are embedded in the base 50 of the U. These layers also extend between the two ends 60 of the device, but the filaments in these layers extend perpendicular to the filaments in the layers 66 and 68.

The device of FIG. 6 has regions 62 and 64 of relatively lower bending resistance and it therefore responds to an impact in the manner shown in FIG. 8. These regions of relatively lower bending resistance may be obtained by, for example, crimping the filaments in the fabric layers 66, 68 at this point or forming a bend in the fabric itself. Alternatively, the same effect may be obtained by adjusting the relative stiffness of the base 50 and the legs 56, 58.

The use of the composite material of the type disclosed in connection with FIG. 1 in the device of FIG. 6 has a number of important advantages. In particular, the material has great strength and its bending resistance can be made very high and easily adjusted during manufacture, and furthermore the bending resistance of the material can easily be made different in various directions. It can easily be given a decorative finish or fitted with decorative attachments such as chromium-plated steel strips. When used as a bumper or fender for a vehicle, a number of the other points are worthy of note:

1. Complex shapes can be easily manufactured, such as holes or depressions for lights and other items.

2. Items such as over-riders can be moulded within the main structure.

3. The structure can be moulded to fit round a radiator grille, license plates, lamps and other fitments on the vehicle.

4. Items such as reflectors or decorative finishes can easily be incorporated in the rubber, either by compounding or by attachment.

5. By varying the rigidity at various points (in the manner described), it is possible to make the structure more resistant to deformation at points near to lamps, bodywork and the like.

6. By suitable predetermination of the rigidity of the various bending points in the structure, it is possible to arrange that the resisting forces per unit of total deformation linearly increase as in a spring or are linearly constant as in a hydraulic damper, or are of some other form such as decreasing or increasing in a non-linear form. Such adjustment is simple and inexpensive.

It will be noted that the energy absorbing devices described are distinguished from devices relying mainly or solely on rubber or an elastomer, in which impact absorption is performed by the rubber or elastomer acting mainly in shear. As described in this specification, on the other hand, the rubber is combined with another component to produce a composite which acts in bending as a beam, but nevertheless retains the shear properties of the rubber which allow large deformations without failure.

FIGS. 9 and 10 show a cross-section through another form of bumper or fender which again is made of rubber material 80 in which are embedded two fabric layers 66 and 68 corresponding to layers 66 and 68 of the device of FIG. 6. Again, the filaments in the fabric extend around the whole of the U as in the FIG. 6 device. Unlike the latter device, however, the device of FIGS. 9 and 10 does not have the additional fabric layers 70 and 72. FIG. 10 shows the configuration which the device of FIG. 9 assumes in response to an impact, and again it will be seen that bending takes place which is resisted by the composite beam and absorbs the energy of the impact. The means by which the device of FIGS. 8 and 9 is clamped to the vehicle is not shown in these Figures.

FIGS. 11 and 12 correspond generally with FIGS. 9 and 10, respectively, and show another configuration.

The energy absorbing device of FIGS. 13 and 14 is again a bumper or fender for a vehicle and has embedded fabric layers 66, 68, 70 and 72 arranged generally similarly to the layers in FIG. 6. FIG. 13 shows how a structure 90 may be moulded into the rubber to hold a license plate.

FIG. 15 shows how the device of FIG. 6 may be given a more complex shape so as to provide overall protection to the front of a vehicle, with openings and apertures for the lights, radiator grille, and license plates of the vehicle.

One problem which may occur in designing the configuration of an energy absorbing device such as, for example, a bumper or fender for a vehicle, is the difficulty of dealing with different types of impact. Thus the impact may take place over only a comparatively small length of the device (for example, when the device is a bumper or fender on a vehicle and the vehicle strikes a post or pole) or over a greater part or whole of the length of the device. If the device is made sufficiently stiff to give the desired decelerating force, over a predetermined deformation distance, in response to a point impact, the stiffness of the device will be such that in response to an impact over the full length or at least a considerable portion of the length of the device, only a small part of the distance available for deformation will be utilized and the impact will be absorbed but will give considerably higher loads on the vehicle which may not be acceptable. Conversely, if the device is designed to be of stiffness to give acceptable deceleration to a full width collision, it will give insufficient deceleration in response to a point impact and not absorb all the energy satisfactorily.

FIGS. 16, 17 and 18 show perspective views of vehicle bumpers or fenders in which the impact receiving face is non-rectilinear over a substantial part of its length. Therefore, an impact will be received by only a relatively small area of the impact receiving face, and this will be so whether the impact is a point impact, such as by a collision of the vehicle with a pole or post, or an impact with a larger area. This enables the whole of the device to be made sufficiently stiff to give a desired decelerating force over a predetermined deformation distance in response to a point-type collision, since, effectively, the device will only be subjected to point-type impacts.

In the case of the device of FIG. 16, the impact receiving face is convexly curved for a substantial part of the length of the face. In a modified form, the face may be convexly curved over its whole length. In other constructions, the impact receiving face may include straight portions or consist of straight portions 92, 94 arranged in staggered relationship (as in the case of FIG. 18). In the case of the device of FIG. 17, the impact receiving face has projections 96. In modifications, there may be recesses instead or as well.

The whole of the impact receiving face need not present the same stiffness. For example, when the projections are provided, the projections and/or adjoining portions may be of a different stiffness from the other parts of the structure.

The devices of FIG. 16 to 18 are made of suitable material whose design or configuration is such that it has a high resistance to bending so as to absorb the energy of the impact. For example, the devices of FIGS. 16 to 18 may be constructed and may operate in the manner described with reference to FIG. 5 and 6.

The energy absorbing devices described are not restricted to use on automobiles but may be used on ships and other moving objects, and the word "vehicle" is to be construed accordingly. Furthermore, the devices described may be used on fixed objects to provide crash barriers and the like.

The term "bumper" or "fender" for a vehicle as used herein in intended to include vehicle over-riders and under-riders, and also to include an end or side vehicle body portion of the form shown in FIG. 15.

What I claim is:

1. An energy controlling device comprising elastomeric material with a plurality of filaments of flexible material embedded therein and bonded or mechanically locked thereto so as to produce a composite beam structure, the composite beam structure being so arranged for mounting with respect to the positioning of the filaments in the elastomeric material and with respect to a predetermined impact direction that when the structure bends in response to an impact occurring in said direction at least some of the filaments are placed in compression and at least some of the filaments are placed in tension, the filaments having such cross-sectional area and modulus of elasticity that the compressive forces generated in the structure by the impact are principally taken by the filaments and the energy of the impact is at least partially controlled by the consequential increased bending reistance of the composite beam structure.

2. A device according to claim 1, in which there are at least two sets of the filaments, each set including at least one row of parallel filaments lying in a plane parallel to the plane of the row in each other set, the said sets being spaced apart in the elastomeric material in a direction normal to the said planes, and the composite structure being so arranged for mounting that impacts in the said direction tend to bend the structure about lines parallel to the said planes and transverse to the filaments.

3. A device according to claim 2, in which all the filaments in said two sets extend in the same direction.

4. A device according to claim 2, in which the filaments of each of the two said sets are woven into a respective piece of fabric.

5. A device according to claim 1, in which the filaments are filaments of a plastic material.

6. A device according to claim 5, in which the filaments are made of polyethylene terephthalate.

7. A device according to claim 1, in which the filaments are of sufficient modulus of elasticity and diameter to act as the principal compression and tension members in the composite beam structure with the elastomeric material.

8. A device according to claim 1, in which the modulus of elasticity of each filament exceeds 10,000 lbs. per sq. inch.

9. A device according to claim 1, in which the diameter or effective diameter of each filament exceeds 0.001 inches.

10. A device according to claim 1, in which the elastomeric material is rubber.

11. An energy controlling device comprising elastomeric material with a plurality of filaments of flexible material embedded therein and bonded or mechanically locked thereto so as to produce a composite beam structure, and support means attached to the composite beam structure for supporting it at such a position or positions thereon that impacts received by the material along a range of directions which are predetermined with respect to the support means and the filaments tend to place at least some of said filaments in compression and at least some of said filaments in tension and are principally absorbed by the resistance to bending imparted to the elastomeric material by the resistance to compression of those filaments.

12. A device according to claim 11 in which there are at least two sets of the filaments, each set including at least one row of parallel filaments lying in a plane parallel to the plane of the row in each other set, said sets being spaced apart in the elastomeric material in a direction normal to said planes, and the support means being so attached to the composite structure that impacts in said directions tend to bend the structure about lines parallel to said planes and transverse to the filaments.

13. A device according to claim 12 in which all the filaments in said two sets extend in the same direction, the filaments of each of the two said sets being woven into a respective piece of fabric.

14. A device according to claim 13 in which said filaments are a plastic material, the modulus of elasticity of each filament exceeds 10,000 lbs. per sq. inch, and the diameter or effective diameter of each filament exceeds 0.001 inches.

15. A device according to claim 14 in which the modulus of elasticity of each filament lies in the range 400,000 to 600,000 lbs. per sq. inch, and the diameter or effective diameter of each filament is about 0.010 inches.

16. A device according to claim 14 in which the breaking stress of each filament is between 50,000 and 100,000 lbs. per sq. inch.

17. A device according to claim 11 in which said elastomeric material is rubber.

18. An energy controlling device comprising wall means embracing or surrounding a space and outwardly presenting an impact receiving face and at least partly made of elastomeric material with a plurality of embedded filaments of flexible material which extend longitudinally towards said face, the filaments being bonded or mechanically locked to the elastomeric material so as to produce a composite beam structure, and the filaments being so positioned in the elastomeric material that an impact on said face tending to deform the wall means places at least some of the filaments in compression and at least some of the filaments in tension, and the energy of the impacts is at least partially controlled by the resistance to bending imparted to the composite beam structure by the resistance to compression of those filaments which take the compressive forces generated by said impacts.

19. A device according to claim 18 in which the modulus of elasticity of each filament lies in the range 400,000 to 600,000 lbs. per sq. inch, and the diameter or effective diameter of each filament is about 0.010 inches.

20. A device according to claim 18 in which the breaking stress of each filament is between 50,000 and 100,000 lbs. per sq. inch.

21. A device according to claim 18, in which
the wall means is in the form of a generally U-shaped channel, with the outside of the base of the U defining the said impact receiving face, and
the said filaments run within and along the lines of extension of the legs of the U and within the base of the U from one leg to the other.

22. A device according to claim 18, in which all the said face does not lie in the same plane.

23. A device according to claim 18, for use as a vehicle fender and shaped to define openings providing access to or reception for a part of or an attachment to the vehicle.

24. A device according to claim 21, in combination with clamping means for attaching the distal ends of the leg portions to an article to be protected from the said impact.

25. A device according to claim 21, including a further plurality of the filaments within the base of the U, but running transversely to the first mentioned filaments therein.

26. A device according to claim 21, in which the relative stiffnesses of the material of the impact-receiving face and of the legs of the U are such that the legs bend outwards away from each other in response to a said impact.

27. A device according to claim 21, in which each leg of the U has a region in which the bending resistance of the filaments has been reduced and arranged such that the legs of the U bend outwards away from each other in response to a said impact.

28. A device according to claim 18, in which the filaments are filaments of plastics material.

29. A device according to claim 28, in which the filaments are made of polyethylene terephthalate.

30. A device according to claim 18, in which the filaments are of sufficient modulus of elasticity, diameter and yield point to act both as the principal compression members and as the principal tension members in the composite beam structure with the elastomeric material.

31. A device according to claim 18, in which the modulus of elasticity of each filament exceeds 10,000 lbs. per sq. inch.

32. A device according to claim 18, in which the diameter or effective diameter of each filament exceeds 0.001 inches.

33. A device according to claim 18, in which the filaments are woven into fabric.

34. A device according to claim 33, in which the filaments are formed into yarns, each comprising a plurality of the filaments, before weaving into the fabric.

35. A device according to claim 18, in which the elastomeric material is rubber.

36. A device according to claim 18, in which the face has at least one projection.

37. A device according to claim 18, in which the stiffness of the wall means varies along the length of the said face.

38. An energy controlling bumper or fender for protecting a vehicle against impacts occurring in anticipated directions which comprises an elastomeric material having filaments embedded therein and bonded or mechanically locked thereto so as to produce a composite beam structure which has a substantially higher resistance to bending in directions which place at least some of the filaments in compression and at least some of the filaments in tension than has the elastomeric material alone, and means mounting the composite beam structure on the vehicle so as to present a face positioned to receive said impacts such that they tend to bend the structure in said directions whereby the compressive forces generated by the impacts are mainly taken by those filaments.

39. A bumper or fender according to claim 38 in which there are at least two sets of the filaments, each set including at least one row of parallel filaments lying in a plane parallel to the plane of the row in each other set, said sets being spaced apart in the elastomeric material in a direction normal to said planes, said planes being parallel to said face, and all the filaments in said two sets extending in the same direction.

40. A bumper or fender according to claim 38 in which the filaments are a plastic material, the modulus of elasticity of each filament exceeds 10,000 lbs. per sq. inch, and the diameter or effective diameter of each filament exceeds 0.001 inches.

41. A bumper or fender according to claim 38 in which the elastomeric material is rubber.

42. An energy controlling device comprising wall means embracing or surrounding a space and outwardly presenting an impact-receiving face, the wall means being made of elastomeric material with two parallel fabric layers embedded therein and respectively positioned adjacent the inner and outer faces of the wall means, each fabric layer incorporating a plurality of filaments of a plastic material which over a portion of their lengths, at least, extend longitudinally towards said face, each filament having a modulus of elasticity in the range 400,000 to 600,000 lbs. per sq. inch, a breaking stress between 50,000 and 100,000 lbs. per sq. inch, and a diameter or effective diameter exceeding 0.001 inches, the filaments being bonded or mechanically locked to the elastomeric material so as to produce therewith a composite beam structure, whereby an impact on said face tends to deform the wall means placing at least some of the filaments in compression and at least some of the filaments in tension, such that the compressive forces generated in the structure by the impacts are principally taken by those filaments placed in compression and the energy of the impacts is controlled by the consequential increased bending resistance of the structure.

* * * * *